(12) United States Patent
Fechtel (10) Patent No.: US 9,178,737 B2
(45) Date of Patent: Nov. 3, 2015

(54) METHOD FOR GENERATING AN OFDM DATA SIGNAL

(71) Applicant: Intel Mobile Communications GmbH, Neubiberg (DE)

(72) Inventor: Stefan Fechtel, Zorneding (DE)

(73) Assignee: Intel Deutschland GmbH, Neubiberg (DE)

(*) Notice: Subject to any disclaimer, the term of this patent is extended or adjusted under 35 U.S.C. 154(b) by 126 days.

(21) Appl. No.: 13/681,555

(22) Filed: Nov. 20, 2012

(65) Prior Publication Data

US 2014/0140194 A1    May 22, 2014

(51) Int. Cl.
*H04L 27/26*    (2006.01)

(52) U.S. Cl.
CPC ........ *H04L 27/2602* (2013.01); *H04L 27/2605* (2013.01); *H04L 27/2627* (2013.01)

(58) Field of Classification Search
None
See application file for complete search history.

(56) References Cited

U.S. PATENT DOCUMENTS

| | | | |
|---|---|---|---|
| 5,886,749 A * | 3/1999 | Williams et al. | 348/614 |
| 6,999,503 B1 * | 2/2006 | Vadde | 375/219 |
| 7,039,140 B2 * | 5/2006 | Reagan et al. | 375/355 |
| 7,801,564 B2 * | 9/2010 | Chae et al. | 455/562.1 |
| 7,961,800 B2 * | 6/2011 | Yoshida | 375/260 |
| 8,244,132 B2 * | 8/2012 | Lin | 398/81 |
| 8,284,851 B2 * | 10/2012 | Yoshimoto et al. | 375/260 |
| 8,339,978 B2 * | 12/2012 | Sawai et al. | 370/252 |
| 2003/0179766 A1 * | 9/2003 | Azadet | 370/436 |
| 2004/0170228 A1 * | 9/2004 | Vadde | 375/260 |
| 2004/0213194 A1 * | 10/2004 | Tsuie | 370/342 |
| 2004/0264362 A1 * | 12/2004 | Rhodes | 370/208 |
| 2006/0135211 A1 * | 6/2006 | Chae et al. | 455/562.1 |
| 2006/0227699 A1 * | 10/2006 | Chini et al. | 370/208 |
| 2007/0025457 A1 * | 2/2007 | Wang | 375/260 |

FOREIGN PATENT DOCUMENTS

EP    2337293 A1    6/2011

OTHER PUBLICATIONS

Mario Huemer and Johannes B. Huber, Unique Word Prefix in SC/FDE and OFDM: A Comparison, IEEE Globecom 2010 Workshop on Broadband Single Carrier and Frequency Domain Communications.*
Mario Huemer, et al. "Uinque Word Prefix in SC/FDE and OFDM: A Comparison" Globecom Workshop pp. 1296-1301, Published Dec. 6, 2010.
Mario Huemer, et al. "Non-Systematic Complex Number RS Coded OFDM by Unique Word Prefix" IEEE Transactions on Signal Processing, vol. 60, No. 1, Published Jan. 2012.
International Search Report and Written Opinion of the International Searching Authority dated Mar. 14, 2014 for International Application No. PCT/EP2013/073491.
Michael Speth, et al.; "Optimum Receiver Design for Wireless Broad-Band Systems Using OFDM-Part I", IEEE, vol. 47, No. 11, Nov. 1999, p. 1668-1677.

(Continued)

*Primary Examiner* — Edan Orgad
*Assistant Examiner* — Emmanuel Maglo
(74) *Attorney, Agent, or Firm* — Eschweiler & Associates, LLC (57) ABSTRACT

An OFDM signal generator includes a time domain data signal generator configured to generate a time domain data signal, a partial signal generator configured to generate a plurality of partial signals based on a tail section of the time domain data signal, and a circuit element configured to form a difference between or a sum of the time domain data signal and the plurality of partial signals.

28 Claims, 7 Drawing Sheets

(56) References Cited

OTHER PUBLICATIONS

H. Sari, et al.; "Freuency-Domain Equalization of Mobile Radio and Terrestial Broadcast Channels", IEEE, 1994, p. 1-5.

Werner Henkel, et al.; "Inherent Time-Frequency Coding in OFDM-a Possibility for ISI Correction Without a Cyclic Prefix".
Mario Huemer, et al.; "The Potential of Unique Words in OFDM".
Mario Huemer, et al.; "Complex Number RS Coded OFDM with Systematic Noise in the Guard Interval".

\* cited by examiner

METHOD FOR GENERATING AN OFDM DATA SIGNAL

FIELD

The invention relates to a method for generating an OFDM data signal and an OFDM signal generator.

BACKGROUND

An orthogonal frequency division multiplexing (OFDM) communication system transmits high-speed data through a radio channel and uses a plurality of carriers that are orthogonal to each other. When an OFDM symbol is transmitted through a multi-path channel, the currently transmitted symbol may be affected by a previously transmitted symbol. In order to mitigate the inter-symbol interference (ISI) between OFDM symbols, a guard interval (GI) longer than the maximum delay spread of a channel is inserted between successive symbols. An OFDM symbol period is thus comprised of a sum of an effective symbol interval in which actual data is transmitted and a GI. A receiver detects and demodulates data associated with the effective symbol interval after removing the GI.

The concept of OFDM communication has been adopted in wireless standards such as the Digital Video Broadcasting-Terrestrial (DVB-T) standard, the Digital Audio Broadcasting (DAB) standard, the Institute of Electrical & Electronic Engineers (IEEE) 802.11a Local Area Network (LAN) standard, and the IEEE 802.16a Metropolitan Area Network standard. Accordingly, the OFDM scheme is currently being considered as a representative scheme for future use in $4^{th}$ generation (4G) mobile communication systems.

BRIEF DESCRIPTION OF THE DRAWINGS

The accompanying drawings are included to provide a further understanding of aspects of the disclosure and are incorporated in and constitute a part of this specification. The drawings illustrate aspects and together with the description serve to explain principles of aspects. Other aspects and examples and many of the intended advantages of aspects and examples will be readily appreciated as they become better understood by reference to the following detailed description. Like reference numerals designate corresponding similar parts.

DETAILED DESCRIPTION

The aspects and examples are described with reference to the drawings, wherein like reference numerals are generally utilized to refer to like elements throughout. In the following description, for purposes of explanation, numerous specific details are set forth in order to provide a thorough understanding of one or more aspects or examples. It may be evident, however, to one skilled in the art that one or more aspects or examples may be practiced with a lesser degree of the specific details. In other instances, known structures and elements are shown in schematic form in order to facilitate describing one or more aspects or examples. It is to be understood that other examples may be utilized and structural or logical changes may be made without departing from the scope of the disclosure.

In addition, while a particular feature or aspect of an example may be disclosed with respect to only one of several implementations, such feature or aspect may be combined with one or more other features or aspects of the other implementations as may be desired and advantageous for any given or particular application. Furthermore, to the extent that the terms "include", "have", "with" or other variants thereof are used in either the detailed description or the claims, such terms are intended to be inclusive in a manner similar to the term "comprise". The terms "coupled" and "connected", along with derivatives may be used. It should be understood that these terms may be used to indicate that two elements co-operate or interact with each other regardless whether they are in direct physical or electrical contact, or they are not in direct contact with each other. Also, the term "exemplary" is merely meant as an example, rather than the best or optimal. The following detailed description, therefore, is not to be taken in a limiting sense, and the scope of the present invention is defined by the appended claims.

The apparatuses and methods as described herein are utilized as part of and for radio transmission systems, namely for systems operating in the Orthogonal Frequency Division Multiplex (OFDM) mode. The apparatuses disclosed may be embodied in baseband segments of devices used for the transmission or reception of OFDM radio signals, in particular base stations, relay stations, mobile phones, hand-held devices or other kinds of mobile radio receivers. The described apparatuses may be employed to perform methods as disclosed herein, although those methods may be performed in any other way as well.

The following description may be read in connection with any kind of multiple carrier radio transmission systems, in particular any mobile communications systems employing multiple carrier modulation, such as, for example, the Universal Mobile Telecommunications System (UMTS) Standard or the Long Term Evolution (LTE) Standard.

The following description may also be read in connection with multiple carrier radio transmission systems in the field of digital video broadcasting (DVB-T/H) which is based on terrestrial transmitters and a communication system design adapted for mobile or hand-held receivers. However, also other communications systems, for example, satellite OFDM systems, may benefit from the concepts and principles outlined herein.

The methods and apparatuses as described herein may be utilized with any sort of antenna configurations employed within the multiple carrier radio transmission system as described herein. In particular, the concepts presented herein are applicable to radio systems employing an arbitrary number of transmit and/or receive antennas, that is Single Input Single Output (SISO) systems, Single Input Multiple Output (SIMO) systems, Multiple Input Single Output (MISO) systems and Multiple Input Multiple Output (MIMO) systems.

Figure 1:
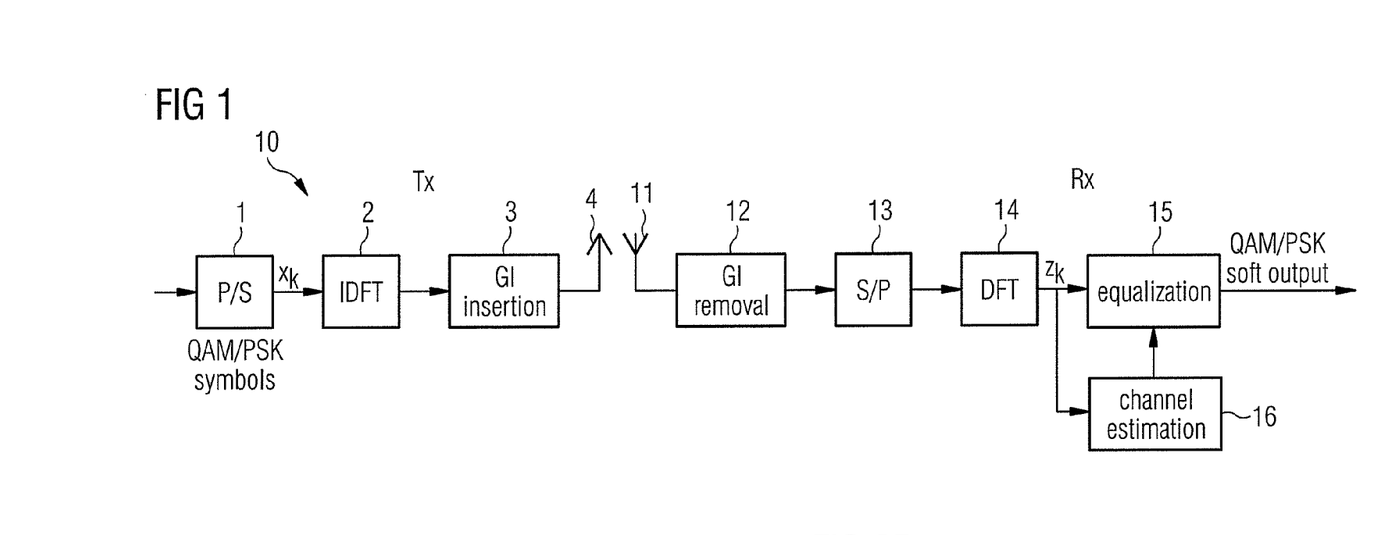
FIG. 1 illustrates an exemplary OFDM transmission system.

Referring to FIG. 1, a schematic block diagram of an OFDM transmission system 10 is shown. In a transmitter Tx OFDM symbols are formed, each comprising N parallel sub-carriers in the frequency domain (FD). The OFDM symbols are fed into a parallel/serial (P/S) converter 1 and thereafter they are transformed into the time domain (TD) by an inverse (discrete) Fourier transformation (N-IDFT) in an inverse (discrete) Fourier transformer 2 (also called OFDM modulator). In a guard interval (GI) insertion unit 3 a guard interval is added to the time domain data signal and finally the OFDM symbol is transmitted by a transmission antenna 4. In a receiver Rx the OFDM symbol is received by a reception antenna 11 and thereafter in a guard interval removal unit 12, the guard interval is removed from the OFDM symbol. Thereafter, the OFDM symbol is fed into a serial/parallel (S/P) converter 13 which supplies the converted signal to a (discrete) Fourier transformer 14 (also called OFDM demodulator) in which the time domain signal is transformed back into frequency domain by (discrete) Fourier transformation (N-DFT). The output of the Fourier transformer 14 is delivered to an equalization unit 15 and to a channel estimation unit 16. The channel estimation unit 16 supplies the results of the channel estimation to the equalization unit 15 which then provides OFDM symbols at an output thereof. The OFDM symbols input into the P/S converter 1 or output by the equalization unit 15 can be modulated according to quadrature amplitude modulation (QAM) or phase shift keying modulation (PSK) or any other modulation scheme.

Under certain conditions, the complex baseband representation of the received signal $z_k$ after the Fourier transformation in the Fourier transformer 14 OFDM demodulation for sub-carrier k (symbol time index/ignored here) reduces to $$z_k = H_k x_k + n_k, k=0,\ldots,N-1 \quad (1)$$

where $x_k$ denote the transmitted FD QAM/PSK modulation symbols, $H_k$ the channel transfer function, and $n_k$ the additive noise plus interference. In order for this very favorable model (1) to be valid, ISI (inter-symbol interference) caused by dispersive channels must be kept away from the demodulating Fourier transformer 14 in the receiver. OFDM therefore features a guard interval (GI) being inserted between consecutive OFDM symbols in order to let ISI transients die out before a new symbol begins. According to one example, this guard interval is filled with a cyclic prefix (CP) of length L taken from the end of the useful OFDM symbol following the GI. By ignoring the GI (CP removal), the receiver can suppress any ISI that does not exceed the GI length L (correct timing assumed). This establishes model (1) despite the presence of ISI, however, at the cost of reduced transmission efficiency, i.e., N+L samples must be transmitted to convey N samples of useful information.

Figure 2A:
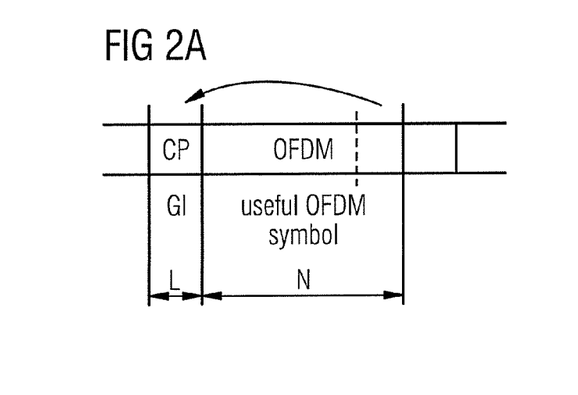
FIGS. 2A and 2B illustrates examples for OFDM symbol formats.
Figure 2B:
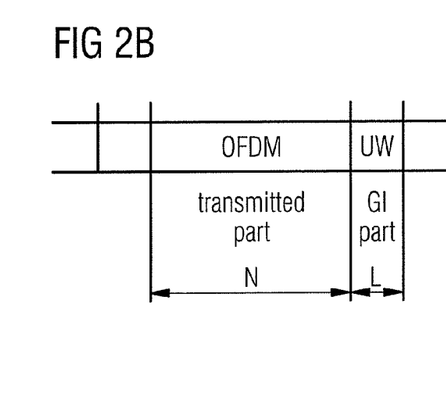

Referring to FIGS. 2A and 2B, examples for OFDM symbol formats are shown. In the symbol format as shown in FIG. 2A (CP-OFDM), the CP appears random and is not part of the signal processed by the IDFT nor the DFT (CP removal). The useful OFDM symbol length equals the DFT length N, and the total OFDM symbol length is N+L. Another symbol format is shown in FIG. 2B (UW-OFDM) where a known deterministic sequence, the "unique word" is used to fill the guard interval instead of the cyclic prefix (not necessarily at the end of the OFDM symbol). In contrast to CP-OFDM, in UW-OFDM IDFT/DFT processing not only contains the useful part of the OFDM symbol but also the guard interval. Hence, in UW-OFDM, the useful OFDM symbol length is N-L, and the total OFDM symbol length equals the DFT length N.

According to an aspect of the disclosure, a method for generating an OFDM signal comprises generating an OFDM signal, the OFDM signal comprising a data section and a guard interval, and generating the data section and the guard interval by forming a difference between a time domain data signal and a plurality of partial signals, each one of the partial signals being derived from a tail section of the time domain data signal.

Figure 3:
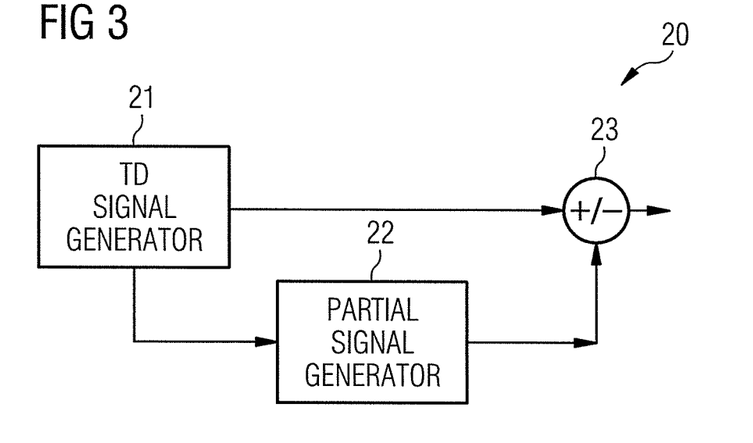
FIG. 3 illustrates a schematic block representation of an exemplary OFDM signal generator.

Referring to FIG. 3, a schematic block representation of an exemplary OFDM signal generator is shown with which the above method can be carried out. The OFDM signal generator signal 20 of FIG. 3 comprises a time domain (TD) data signal generator 21 configured to generate a time domain data signal, a partial signal generator 22 configured to generate a plurality of partial signals based on a tail section of the time domain data signal, and a circuit element 23 configured to form a difference or a sum between the time domain data signal and the plurality of partial signals. The circuit element 23 can thus be comprised of a subtractor or an adder. A first output of the time domain data signal generator 21 can be connected to an input of the partial signal generator 22 in order to supply the time domain data signal to the partial signal generator 22. A second output of the time domain signal generator 21 can be connected with a first input of the circuit element 23. An output of the partial signal generator 22 can be connected with a second input of the circuit element 23. At an output of the circuit element 23 an OFDM signal to be transmitted can be delivered.

The time domain data signal generator 21 can be configured to receive a frequency domain data signal and perform an inverse Fourier transformation of the frequency domain data signal to generate the time domain data signal. The time domain data signal generator 21 may thus be configured as an inverse fast Fourier transformer in one embodiment. The time domain data signal generated by the time domain data signal generator 21 may comprise a tail section which may be effectively replaced by a guard interval by virtue of the partial signal generator 22 and the circuit element 23. The partial signal generator 22 may be configured to generate a tail section signal comprising the tail section of the time domain data signal and form a plurality of partial signals, wherein each one of the partial signals can be based on the tail section. The circuit element 23 may be configured to form a difference or a sum of the time domain data signal and the plurality of partial signals generated by the partial signal generator 22. The circuit element 23 may thus be configured to either subtract the plurality of partial signals from the time domain data signal or subtract the time domain data signal from the plurality of partial signals or add the plurality of partial signals to the time domain data signal. The partial signals can be distributed over the empty portion of the time domain data signal in such a way that they are spaced from each other with equal intervals and have identical time durations. Moreover, the partial signals can be either identical with each other or they can be different from each other. The partial signals can, for example, be calculated based on the tail section according to a particular predetermined calculation rule.

Figure 4:
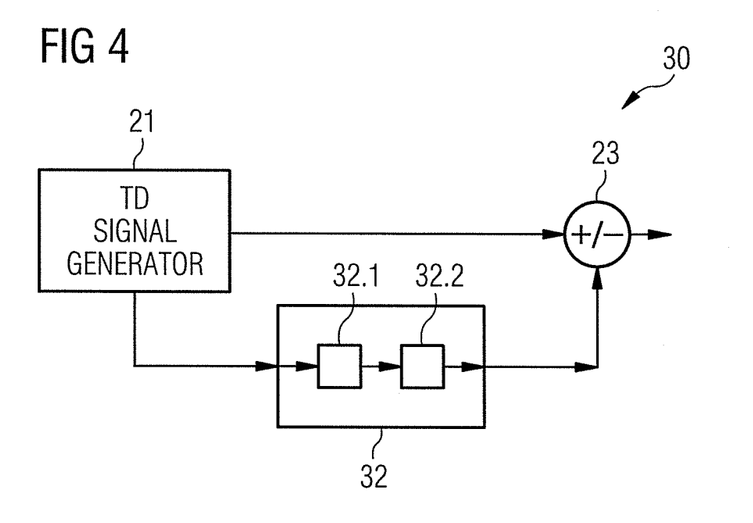
FIG. 4 illustrates an exemplary OFDM signal generator having a tail section signal generator and a multiplied tail section signal generator.

Referring to FIG. 4, a schematic block representation of an exemplary OFDM signal generator is shown. The OFDM signal generator 30 can be looked at as a further development of the OFDM signal generator 20 of FIG. 3, in particular as it shows a partial signal generator 32 of somewhat more detail. The partial signal generator 32 as a whole is configured to generate a plurality of partial signals based on a tail section of the time domain data signal. The partial signal generator 32 includes a tail section signal generator 32.1 and a multiplied tail section signal generator 32.2. The tail section signal generator 32.1 is configured to generate a tail section signal comprising a tail section of the time domain data signal. The tail section signal can be derived from the time domain data signal in such a way that only the tail section of the time domain data signal is preserved and all signals of the remaining portion of the time domain data signals are set to zero. The multiplied tail section signal generator 32.2 can be configured to form a plurality of partial signals wherein each one of the partial signals are derived from or based on the tail section. In the following the tail section is also called GI (guard interval) section as due to the method described here the tail section is effectively replaced by an empty guard interval section which can be filled up later by a unique word.

An output of the time domain signal generator 21 can be connected with an input of the tail section signal generator 32.1 for delivering the time domain data signal to the tail section signal generator 32.1, and an output of the tail section signal generator 32.1 can be connected with an input of the multiplied tail section signal generator 32.2 for delivering the tail section signal to the multiplied tail section signal generator 32.2. The output of the time domain data signal generator 21 can be connected with a first input of the circuit element 23, and an output of the multiplied tail section signal generator 32.2 can be connected with a second input of the circuit element 23.

Figure 5:
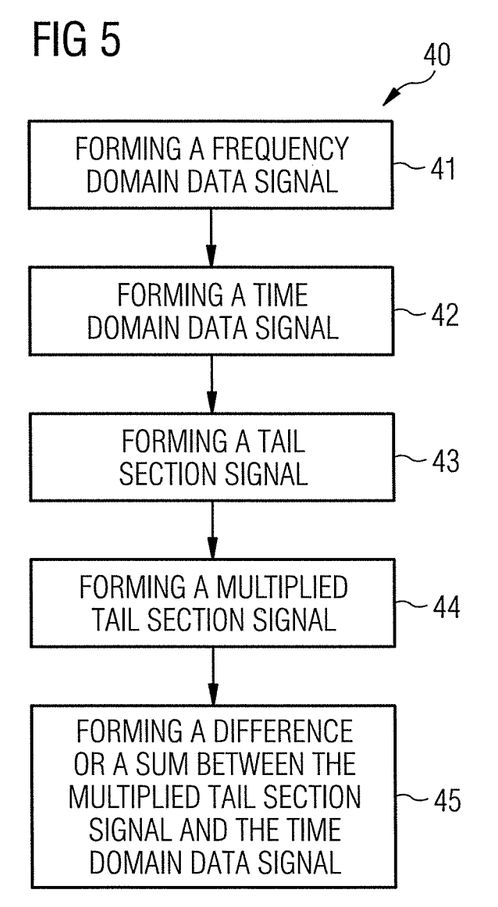
FIG. 5 illustrates a flow diagram of an exemplary method for generating an OFDM signal.

Referring to FIG. 5, there is shown a method for generating an OFDM data signal according to an aspect of the disclosure. The method 40 of FIG. 5 comprises forming a frequency domain data signal including determining a plurality of non-data carriers and setting the non-data carriers to zero at 41, forming a time domain data signal by performing an inverse Fourier transformation of the frequency domain data signal at 42. The method 40 further comprises forming a tail section signal comprising a tail section of the time domain data signal at 43, forming a multiplied tail section signal by forming a plurality of partial signals, each one of the partial signals being derived from or based on the tail section at 44, and forming a difference or a sum between the multiplied tail section signal and the time domain data signal at 45.

Figure 6:
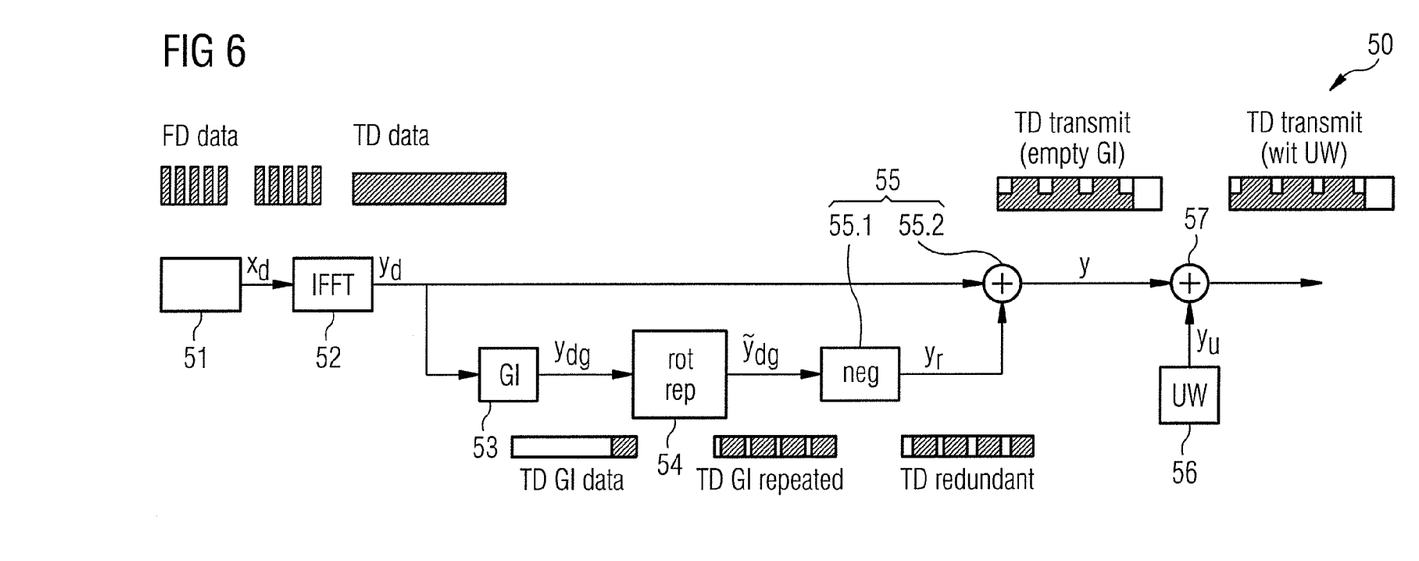
FIG. 6 illustrates a schematic block representation of an exemplary OFDM signal generator having a unique word register.

Referring to FIG. 6, a schematic block representation of an exemplary OFDM signal generator is shown. Also shown are diagrams at the respective signal paths in order to indicate the structure and format of the intermediate and final OFDM symbols. The OFDM signal generator 50 of FIG. 6 comprises a frequency domain data signal generator 51, a time domain data signal generator 52, a tail section signal generator 53, a multiplied tail section signal generator 54, and a difference former 55 including a negator 55.1 and an adder 55.2. The frequency domain data signal generator 51 may be configured to generate a frequency domain data signal by determining a plurality of non-data carriers and setting the non-data carriers to zero. The respective diagram "FD data" is shown above the frequency domain data signal generator 51 and the non-data carriers are indicated by empty gaps in between the data carriers. An output $x_d$ of the frequency domain data signal generator 51 can be connected with an input of the time domain data signal generator 52 for supplying the frequency domain data signal. The time domain data signal generator 52 can be configured to generate a time domain data signal $y_d$ by, for example, performing an inverse Fast Fourier transformation (IFFT) of the frequency domain data signal. The respective diagram "TD data" is shown above the time domain data signal generator 52. An output of the time domain data signal generator 52 can be connected with an input of the tail section signal generator 53 for supplying the time domain data signal thereto. The tail section signal generator 53 can be configured to generate a tail section signal comprising a tail section of the time domain data signal. The tail section signal can be generated, for example, by preserving only the tail section of the time domain data signal and setting the signals in the remaining portion of the time domain data signal to zero. The respective diagram "TD GI data" is shown below the tail section signal generator 53. An output of the tail section signal generator 53 can be connected to an input of the multiplied tail section signal generator 54 for supplying the tail section signal thereto. The multiplied tail section signal generator 54 can be configured to form a plurality of partial signals, each one of the partial signals being derived from or based on the tail section. The respective diagram "TD GI repeated" is shown below the multiplied tail section signal generator 54. An output of the multiplied tail section signal generator 54 can be connected with an input of the difference former 55 for providing the partial signals thereto. The difference former 55 may include a negator 55.1 and an adder 55.2 wherein the negator 55.1 can be configured to change the sign of the partial signals so that the combined effect of the negator 55.1 and the adder 55.2 is the forming of a difference between the time domain data signal and the partial signals. Instead it is also possible to generate the partial signals in the multiplied tail section signal generator 54 in such a way that they already have the "correct" sign so that the negator 55.1 can be omitted. This will be shown below in greater detail. As a result, the tail section of the time domain data signal and the negated tail section of the partial signals nullify each other so that an empty guard interval section is formed at the end of the OFDM symbol, the length of which corresponding to the length of the tail section. This is indicated in the OFDM time diagram "TD transmit (empty GI)" above the adder 55.2.

The OFDM signal generator 50 may further comprise a unique word register 56 and an adder 57. A first input of the adder 57 may be connected to an output of the adder 55.2 and a second input of the adder 57 may be connected with an output of the unique word register 56. The purpose of these additional components is to fill up the empty guard interval with a unique word which can be, in principle, any desired sequence. The unique word can be used, for example, for channel estimation. The resulting OFDM signal is shown in the final time diagram "TD transmit (with UW)".

In the following the methods and devices described so far will be explained in somewhat more detail in connection with FIGS. 7 and 8.

As mentioned above in connection with FIGS. 5 and 6, throughout the frequency bandwidth of the OFDM spectrum a plurality of non-data carriers can be determined and the signals at these non-data carriers can be set to zero. These non-data carriers can be called redundant sub-carriers.

Figure 7:
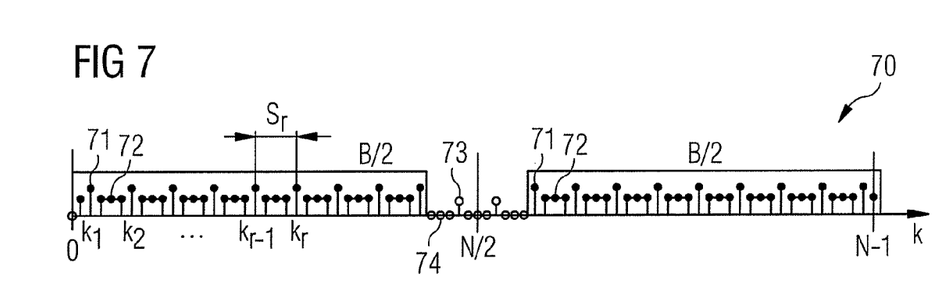
FIG. 7 illustrates an exemplary OFDM format having redundant sub-carrier allocation.

Referring to FIG. 7, an exemplary OFDM format 70 is illustrated showing an example of redundant subcarrier allocation. FIG. 7 shows the redundant subcarriers 71 within the occupied parts B of the OFDM spectrum, redundant subcarriers 73 outside B within the guard band, the data carriers 72, and void carriers within the guard band. The particular OFDM format is characterized by a set $k_r$ of FD redundant subcarrier indices 71 defined such that the bandpass GI signal (here "bandpass" meaning limited in the time-domain) with (two-sided) bandwidth equal to the GI length L can be sampled (here "sampling" in frequency direction) with no (or little) error.

The sampling theorem calls for redundant sub-carrier spacings (between neighboring positions $k_r$) to satisfy $$S_r = (k_r - k_{r-1}) \le N/L \ (r=0 \ldots R-1, k_{-1}=k_{R-1}) \quad (2)$$

In one embodiment, the redundant subcarriers are equally-spaced across the FD OFDM spectrum (then $S_r=S$). If this is not possible (at the edges, near DC, or when conflicting with pilot or other special symbols) other allocations are also possible as long as (2) is satisfied, at least within the occupied parts (bandwidth B) of the spectrum.

Figure 8:
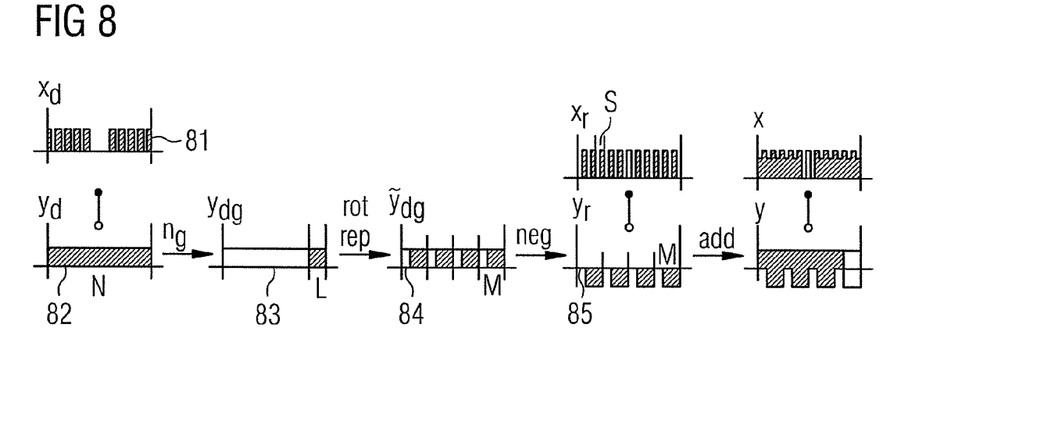
FIG. 8 illustrates a diagram of intermediate OFDM signals as generated by a method for generating a final OFDM signal to be transmitted.

Referring to FIG. 8, time diagrams of OFDM signals are shown as they are generated by a method according to an example. According to an example, one may first form the TD data signal 82

$$y_d = IDFT(x_d) \quad (3)$$

from its FD counterpart $x_d(d, k_d)$ 81 in the same way (via IDFT) as in CP-OFDM, however with non-data subcarriers set to zero. Then one may select the TD GI section of the data signal form the following tail section signal 83

$$y_{dg} = y_{dg}(y_d, n_g) \quad (4)$$

having the GI sample index vector $n_g = [N-L \ldots N-1]^T$, wherein non-GI samples are set to zero. For the sake of simplicity, the $n_g$ shown here—and in the remainder of the document—is valid for a GI located at the end of the OFDM symbol. Note that the general case of the GI being located anywhere in the OFDM symbol is also covered by the disclosure.

Then one may form the TD repeated data GI signal 84

$$\tilde{y}_{dg} = \sum_{s=0}^{S-1} y_{dgs} \text{ with } y_{dgs} = y_{dgs}(w^*_{sM,m_0} y_{dg}, sM + n_g) \quad (5)$$

wherein the GI signal is repeated S times and each repeated partial signal is shifted by a multiple of M samples and rotated by a rotation phasor or rotation factor $w^*_{sM,m_0}$, wherein $$w^*_{sM,m_0} = e^{j \frac{2\pi}{N}(sM \cdot m_0)} \quad (6)$$

wherein M, s, $m_0$ are the time spacing between the partial signals, the index of the partial signals, and the sampling offset, respectively.

At this point it should be mentioned that according to above Eq. (6), in the special case of a sampling offset $m_0$ equal to zero, the rotation factor $w^*_{sM,m_0}$ becomes equal to 1 which means that the rotation factor of all the partial signals of the multiplied tail section signal is equal to 1 so that the partial signals are identical to each other and only shifted to different positions within the time domain data signal. In this special case the rotation factor is independent of the time position whereas in all other cases the rotation factor depends on the time position.

Now from this repeated data signal 84 of above Eq. (5) the TD redundant signal 85 can be formed as $$y_r = -\tilde{y}_{dg} \quad (7)$$

which readily yields the TD transmit signal $y=y_d+y_r$ having an empty GI before possible UW insertion.

At this point it should be added that the above step of Eq. (7) which corresponds to the negator 55.1 of FIG. 6 can also be omitted, namely if a rotation factor $-w^*_{sM,m_0}$ of above Eq. (6) is used. In this case the multiplied tail section signal such as that generated by the multiplied tail section generator 54 of FIG. 6 can be simply added to the time domain data signal in the adder 55.2 of FIG. 6.

The basic procedure of above Eqs. (4) to (7) effectively clears the guard interval of any (non-UW) signal, provided that the redundant carrier positions are chosen as $$k_r = m_0 + m \cdot S \text{ with index vector } m = [0 1 \ldots M-1]^T \quad (8)$$

which calls for equidistant sampling with sampling offset $m_0$, spacing S, and a set of M=N/S>=L redundant samples (FIG. 6). Then the procedure of above Eqs. (4) to (7) works as desired because the FD counterpart $\tilde{x}_{dg} = DFT(\tilde{y}_{dg})$ of (5) is, by construction, nonzero at exactly these positions $m_0+m \cdot S$ and zero otherwise; the TD spacing M translates into FD spacing S, and the TD phase rotation factor $w^*_{sM,m_0}$ translates into FD sampling offset $m_0$. From (7) one may also conclude that the FD redundant sub-carrier symbols are given by $$x_r = -\tilde{x}_{dg} = -DFT(\tilde{y}_{dg}) \quad (9)$$

Figure 9:
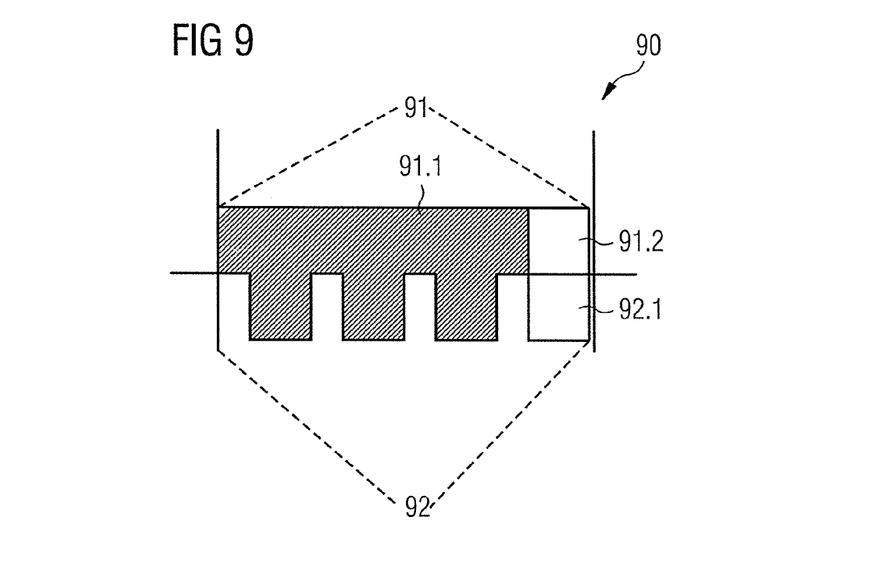
FIG. 9 illustrates a diagram of an exemplary OFDM signal.

Referring to FIG. 9, there is shown a time diagram of an OFDM signal according to an aspect of the disclosure. The OFDM signal 90, as shown in FIG. 9, is basically composed of, or formed by, a superposition, i.e. an addition or subtraction, of a time domain data signal 91 and a plurality of partial signals 92. As was outlined previously, an original time domain data signal was spread over the whole OFDM time frame also covering the section 91.2 which is intended to become the guard interval section. The original time domain data signal was comprised of a signal section 91.1 and a tail section 91.2 at a location which is empty in the finished OFDM signal 90. Among the pluralities of partial signals 92, there was before the superposition a partial signal 92.1, which was the exact negative of the tail section 91.2, so that the superposition has basically the effect that the previous signals 91.2 and 92.1 nullify each other so that an empty guard interval results. The guard interval can be left empty or can also be filled up with a unique word (UW).

Figure 10:
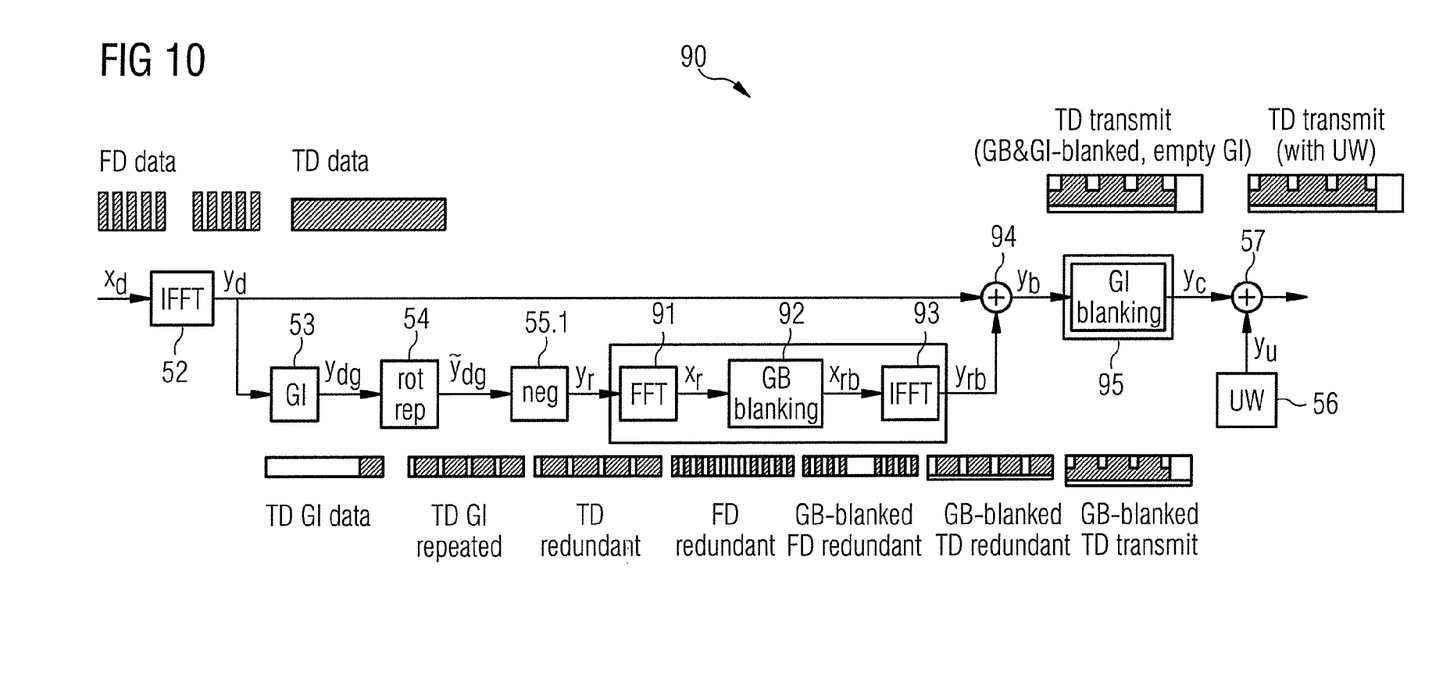
FIG. 10 illustrates a schematic block representation of an OFDM signal generator having a guard band blanking unit, a guard interval blanking unit and a unique word register.

Referring to FIG. 10, there is shown a schematic block representation of an exemplary OFDM signal generator together with time diagrams of intermediate and final OFDM signals. Reference is made herewith to FIG. 6 and the description above. In the following only additional elements will be described which are optional. The OFDM signal generator 90 of FIG. 10 further includes a Fourier transformer 91, a guard band blanking unit 92, an inverse Fourier transformer 93, an adder 94, and a guard interval blanking unit 95. An output of the negator 55.1 is connected with an input of the Fourier transformer 91, an output of the Fourier transformer 91 is connected with an input of the guard band blanking unit 92, and an output of the guard band blanking unit 92 is connected with an input of the inverse Fourier transformer 93. Further, an output of the inverse Fourier transformer 93 is connected with a first input of the adder 94, an output of the inverse Fourier transformer 52 is connected with a second input of the adder 94, an output of the adder 94 is connected with an input of the guard interval blanking unit 95, and an output of the guard interval blanking unit 95 is connected with the adder 57. Again, the combined effect of the negator 55.1 and the adder 94 is the forming of a difference between the time domain data signal and the signal $y_{rb}$ output by the inverse Fourier transformer 93. In other words the negator 55.1 can also be omitted and the adder 94 can be replaced by a subtractor.

The Fourier transformer 91 performs a Fourier transformation of the signal $y_r$ into the frequency domain, thereby generating a signal designated as "FD redundant". Thereafter the GB blanking unit 92 blanks the guard band by, for example, a bandpass filter setting redundant carriers within the GB to zero, thereby generating a signal $x_{rb}$ also designated as "GB-blanked FD redundant". Thereafter the inverse Fourier transformer 93 performs an inverse Fourier transform of the signal $x_{rb}$ into the time domain, thereby generating a signal $y_{rb}$ also designated as "GB-blanked TD transmit".

In order to limit or preclude unwanted out-of-band emissions, guard band blanking confines the FD redundant signal $x_r$—and thus the entire FD signal x—to bandwidth B by eliminating the carriers inside the guard band such as those designated with reference sign 73 in FIG. 7 above. This requires generating the FD redundant symbol $x_r$=DFT($y_r$) and blanking (setting to zero) redundant carriers within the guard band:

$$x_r = DFT(y_r) \tag{10}$$

$$x_{rb} = x_{rb}(x_r, k_{rb}) \text{ with } k_{rb} = k_r (k=m_0+mS \leq B/2 \text{ or } \geq N-B/2) \tag{11}$$

$$y_{rb} = IDFT(x_{rb}) \tag{12}$$

where $k_{rb}$ denotes the index vector of non-GB redundant subcarriers.

FD GB blanking causes some disturbance in the TD transmit signal. In particular, GB blanking gives rise to a residual signal reappearing in the guard interval. In order to save the unique word from this distortion, guard interval blanking confines the TD signal y to the non-GI section by blanking the (residual) signal samples inside the GI. This very simple operation in TD in turn gives rise to some error in the FD samples (constellation error). However, for OFDM configurations (N, B, L) relevant in wireless communications, the error vector magnitude (EVM) resulting from GI blanking is found to be quite small and thus tolerable.

Figure 11:
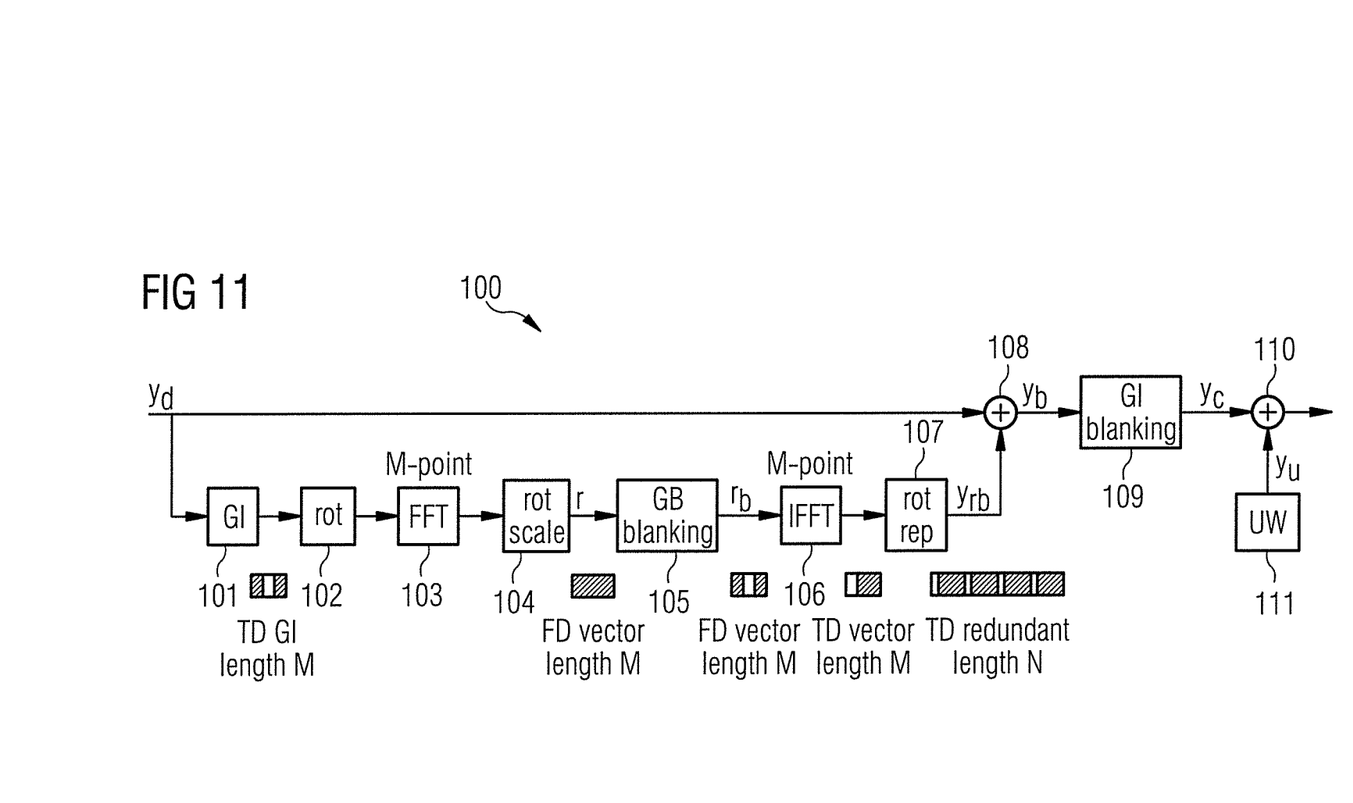
FIG. 11 illustrates a schematic block representation of an OFDM signal generator having a reduced-complexity guard band blanking unit.

Referring to FIG. 11, there is shown a schematic block representation of an exemplary OFDM signal generator. The OFDM signal generator 100 of FIG. 11 comprises a time domain signal generator (not shown) to generate a time domain data signal $y_d$, a tail section signal generator 101, a rotator 102, a Fourier transformer 103, a rotator/scaler 104, a guard band blanking unit 105, an inverse Fourier transformer 106, a multiplied tail section signal generator 107, an adder 108, a guard interval blanking unit 109, an adder 110, and a unique word register 111. The time domain data signal $y_d$ is fed into an input of the tail section signal generator 101, an output of the tail section signal generator 101 is supplied to an input of the rotator 102, an output of the rotator 102 is supplied to an input of the Fourier transformer 103, and an output of the Fourier transformer 103 is supplied to an input of the rotator/scaler 104. Still referring to FIG. 11, an output of the rotator/scaler 104 is supplied to an input of the guard band blanking unit 105, an output of the guard band blanking unit 105 is supplied to an input of the inverse Fourier transformer 106, an output of the inverse Fourier transformer 106 is supplied to an input of the multiplied tail section signal generator 107, and an output of the multiplied tail section signal generator 107 is supplied to a first input of the adder 108. Again, still referring to FIG. 11, the time domain data signal is supplied to a second input of the adder 108, an output of the adder 108 is supplied to an input of the guard interval blanking unit 109, an output of the guard interval blanking unit 109 is supplied to a first input of the adder 110, an output of the unique word register 111 is supplied to a second input of the adder 110, and an output of the adder 110 delivers the OFDM signal to be transmitted.

The first rotator (102) is necessary to cater for nonzero sampling $m_0$ offsets. It multiplies the input signal (GI signal cyclically shifted in time as shown in FIG. 11) by $$e^{-j\frac{2\pi}{N}(N-L...N-1)m_0}$$

vector. The second rotator (104) accounts for the GI position within the OFDM symbol (here GI located at end of OFDM symbol). It multiplies the input signal (M-point FFT output) by $$e^{-j\frac{2\pi}{M}[0...M-1](N\frac{L}{2})}$$

vector. The scaling factor also contained in element (104) is simply given by $\sqrt{S}$. The rotation and repetition unit (107) expands the M-point input signal to an N-point output signal in a similar way as the TD redundant signal $\tilde{y}_{dg}$ is generated from $y_{dg}$, i.e., by forming S copies of the M-point input signal, multiplying each of these copies by a rotation factor, and finally concatenating the S resultant rotated signal copies into a length-N output signal.

The example of an OFDM signal generator addresses the following problem. Basic guard band (GB) blanking described in connection with FIG. 10 above involves FFT/IFFT processing (9,11) with dimension N, i.e., the full OFDM symbol length. One embodiment of GB blanking involves FFT/IFFT processing with dimension reduced to M=N/S, which is not much larger than the GI length. The resulting UW-OFDM transmitter signal processing according to this embodiment of the invention with reduced-complexity GB blanking is illustrated in FIG. 11.

While the invention has been illustrated and described with respect to one or more implementations, alterations and/or modifications may be made to the illustrated examples without departing from the spirit and scope of the appended claims. In particular regard to the various functions performed by the above described components or structures (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the invention.

What is claimed is:

1. A method for generating an OFDM data signal in an OFDM signal generator, comprising:
    forming a frequency domain data signal including determining a plurality of non-data carriers and setting the non-data carriers to zero in a frequency domain data signal generator;
    forming a time domain data signal by performing an inverse Fourier transformation of the frequency domain data signal in a time domain data signal generator;
    forming a tail section signal comprising a tail section of the time domain data signal in a tail section signal generator;
    forming a multiplied tail section signal in a multiplied tail section signal generator, by forming a plurality of partial signals, each one of the partial signals being derived from the tail section signal;

forming a difference between or a sum of the multiplied tail section signal and the time domain data signal in a difference forming circuit, thereby generating the OFDM data signal with a guard interval associated therewith; and transmitting the OFDM data signal using a transmitter circuit.

2. The method according to claim 1, wherein forming a difference between the multiplied tail section signal and the time domain data signal comprises subtracting the multiplied tail section signal from the time domain data signal or subtracting the time domain data signal from the multiplied tail section signal.

3. The method according to claim 1, wherein forming a difference between the multiplied tail section signal and the time domain data signal comprises forming a negated multiplied tail section signal by changing a sign of the multiplied tail section signal and superposing the time domain data signal and the negated multiplied tail section signal.

4. The method according to claim 1, further comprising: determining the plurality of non-data carriers in such a way that the carrier spacings satisfy the relationship $S_r = (k_r - k_{r-1}) \leq N/L$, wherein $k_r$, N, L are the positions of the carriers in the OFDM spectrum, the total frequency band width of the OFDM spectrum, and the length of the tail section, respectively.

5. The method according to claim 1, further comprising: determining the plurality of non-data carriers in such a way that the carriers are equally spaced at least across a region of the OFDM spectrum.

6. The method according to claim 1, further comprising: forming the time domain data signal $y_d$ by inverse Fourier transformation comprises performing the following calculations:

$$y_n = \frac{1}{\sqrt{N}} \sum_{k=0}^{N-1} w_{kn}^* x_k,$$

wherein $$w_{kn}^* = e^{j\frac{2\pi}{N}kn},$$

wherein
N, k, n being the number of sampling points in the frequency domain, the frequency index and the time index, respectively, and wherein w* comprises a rotation factor.

7. The method according to claim 1, further comprising: forming the tail section signal by taking the time domain data signal and setting therein all signal components in sections outside of the tail section to zero.

8. The method according to claim 7, further comprising: forming the tail section signal $y_{dg}$ by selecting a tail section of the time domain data signal $y_d$ $y_{dg} = Y_{dg}(Y_d, n_g)$, wherein $n_g = [_N - L \ldots N-1]^T$ and wherein the signal components of the time domain data signal $y_d$ at $0 \leq n$ N-L-1 are set to zero, wherein n, $n_g$, N, L are the set of indices of non-GI samples, of GI samples, the number of sampling points in the time domain, and the number of sampling points in the tail section, respectively.

9. The method according to claim 1, wherein forming the multiplied tail section signal comprises forming each one of the partial signals by taking a copy of the tail section, shifting the copy to a time position outside of the position of the tail section, and multiplying the copy with a rotation factor.

10. The method according to claim 9, further comprising: forming the multiplied tail section signal by $$\tilde{y}_{dg} = \sum_{s=0}^{S-1} y_{dgs},$$

wherein $Y_{dgs} = Y_{dgs}(w^*_{sM,m_0} y_{dg}, SM + n_g)$, wherein the rotation factor $w^*_{sM,m_0}$ $$w^*_{sM,m_0} = e^{j\frac{2\pi}{N}\cdot(sM \cdot m_0)},$$

wherein
M, s are the time spacing between the partial signals and the index of the partial signals, respectively.

11. The method according to claim 1, further comprising: after forming a difference or a sum between the multiplied tail section signal and the time domain data signal, filling the tail section with a unique word.

12. The method according to claim 1, further comprising: performing a Fourier transform of an inverted multiplied tail section signal;
blanking a guard band from the Fourier transformed inverted multiplied tail section signal; and
performing an inverse Fourier transform of the guard blanked Fourier transformed inverted multiplied tail section signal.

13. The method according to claim 1, further comprising: after forming a difference or a sum between the multiplied tail section signal and the time domain data signal, blanking residual signal samples inside the tail section.

14. A method for generating an OFDM data signal in an OFDM signal generator, comprising:
generating a time domain data signal in a time domain data signal generator;
generating a tail section signal comprising a tail section of the time domain data signal in a tail section signal generator;
generating the OFDM data signal, the OFDM data signal comprising a data section and a guard interval;
generating the data section and the guard interval by forming a difference or a sum between the time domain data signal and a plurality of partial signals in an adder circuit, wherein each one of the partial signals is derived from the tail section data signal; and
transmitting the OFDM data signal using a transmitter circuit.

15. An OFDM signal generator, comprising:
a frequency domain data signal generator configured to generate a frequency domain data signal by determining a plurality of non-data carriers and setting the non-data carriers to zero;
a time domain data signal generator configured to generate a time domain data signal by performing an inverse Fourier transformation of the frequency domain data signal;

a tail section signal generator configured to generate a tail section signal comprising a tail section of the time domain data signal;

a multiplied tail section signal generator configured to form a multiplied tail section signal comprising a plurality of partial signals, wherein each one of the partial signals is based on the tail section signal;

a circuit element configured to form a difference between or a sum of the time domain data signal and the multiplied tail section signal, thereby generating an OFDM signal with a guard interval associated therewith; and a transmitter circuit configured to transmit the OFDM signal.

16. The OFDM signal generator according to claim 15, wherein the circuit element is configured to form the difference between the multiplied tail section signal and the time domain data signal by subtracting the multiplied tail section signal from the time domain data signal.

17. The OFDM signal generator according to claim 15, wherein the circuit element is configured to form the difference between the multiplied tail section signal and the time domain data signal by forming a negated multiplied tail section signal by changing the sign of the multiplied tail section signal and superposing the time domain data signal and the negated multiplied tail section signal.

18. The OFDM signal generator according to claim 15, wherein the frequency domain data signal generator is configured to determine the plurality of non-data carriers in such a way that the carrier spacings between the plurality of non-data carriers satisfy the relationship $S_r = (k_r - k_{r-1}) \leq N/L$, wherein $S_r$, $k_r$, N, and L are the carrier spacing, the positions of the carriers in the OFDM spectrum, the total frequency band width of the OFDM spectrum, and the length of the tail section respectively.

19. The OFDM signal generator according to claim 15, wherein the frequency domain data signal generator is configured to determine the plurality of non-data carriers in such a way that the carriers are equally spaced in frequency at least across a region of the OFDM spectrum.

20. The OFDM signal generator according to claim 15, wherein the time domain data signal generator is configured to form the time domain data signal $y_d$ by inverse Fourier transformation performing the following calculations:

$$y_n = \frac{1}{\sqrt{N}} \sum_{k=0}^{N-1} w^*_{kn} x_k,$$

wherein $$w^*_{kn} = e^{j\frac{2\pi}{N}kn},$$

wherein

N, k, n being the number of sampling points in the frequency domain, the frequency index and the time index, respectively, and $x_K$ represents a data symbol.

21. The OFDM signal generator according to claim 15, wherein the tail section signal generator is configured to form the tail section signal by taking the time domain signal and setting therein all signal components in sections outside of the tail section to zero.

22. The OFDM signal generator according to claim 21, wherein the tail section signal generator is configured to form the tail section signal $y_{dg}$ by selecting a tail section of the time domain data signal $y_d$ $y_{dg} = y_{dg}(y_d, n_g)$, wherein $n_g = [N-L \ldots N-1]^T$ and wherein the signal components of the time domain data signal $y_d$ at $0 \leq n \leq N-L-1$ are set to zero, wherein n, $n_g$, N, and L are a set of indices of non-GI samples, of GI samples, the number of sampling points in the time domain, and the number of sampling points in the tail section, respectively.

23. The OFDM signal generator according to claim 15, wherein the multiplied tail section signal generator is configured to form the multiplied tail section signal by forming each one of the partial signals by taking a copy of the tail section, shifting the copy to a time position outside of the position of the tail section, and multiplying the copy with a rotation factor.

24. The OFDM signal generator according to claim 23, wherein the multiplied tail section signal generator is configured to form the multiplied tail section signal by $$\tilde{y}_{dg} = \sum_{s=0}^{S-1} y_{dgs},$$

wherein $Y_{dgs} = Y_{dgs}(w^*_{sM,m_0} y_{dg}, SM+n_g)$, wherein the rotation factor $w^*_{sM,m_0}$ $$w^*_{sM,m_0} = e^{j\frac{2\pi}{N} \cdot (sM \cdot m_0)},$$

wherein

M, s, $m_0$ are the time spacing between the partial signals, the index of the partial signals, and the sampling offset, respectively.

25. The OFDM signal generator according to claim 15, further comprising:

a unique word register configured to fill the tail section of the time domain signal with a unique word after forming a difference or a sum between the multiplied tail section signal and the time domain data signal.

26. The OFDM signal generator according to claim 15, further comprising:

a guard band blanking unit comprising a Fourier transformer, a guard band blanker, and an inverse Fourier transformer, wherein:

the Fourier transformer is configured to perform a Fourier transform of an inverted version of the multiplied tail section signal, the guard band blanker unit is configured to blank a guard band from the Fourier transformed inverted multiplied tail section signal, and the inverse Fourier transformer is configured to perform an inverse Fourier transform of the guard blanked Fourier transformed inverted multiplied tail section signal.

27. The OFDM signal generator according to claim 15, further comprising:

a guard interval blanking unit configured to blank residual signal samples in the tail section signal after forming a difference or a sum between the multiplied tail section signal and the time domain data signal.

28. An OFDM signal generator, comprising:
a time domain data signal generator configured to generate a time domain data signal;
a tail section signal generator configured to generate a tail section signal comprising a tail section of the time domain data signal;
a partial signal generator configured to generate a plurality of partial signals based on the tail section signal;
a circuit element configured to form a difference between or a sum of the time domain data signal and the plurality of partial signals, thereby generating an OFDM signal with a guard interval associated therewith; and
a transmitter circuit configured to transmit the OFDM signal.

\* \* \* \* \*